(12) United States Patent
Roesner (10) Patent No.: US 8,902,082 B2
(45) Date of Patent: Dec. 2, 2014

(54) COMMUNICATING STATUSES OF VEHICLES

(76) Inventor: Bruce B. Roesner, Durham, NC (US)

( * ) Notice: Subject to any disclaimer, the term of this patent is extended or adjusted under 35 U.S.C. 154(b) by 158 days.

(21) Appl. No.: 13/271,021

(22) Filed: Oct. 11, 2011

(65) Prior Publication Data

US 2013/0088345 A1 Apr. 11, 2013

(51) Int. Cl.
*G08G 1/00* (2006.01)
*G06K 19/077* (2006.01)

(52) U.S. Cl.
CPC .... *G06K 19/07758* (2013.01); *G06K 19/07749* (2013.01)
USPC .............................. 340/928; 340/905; 340/936

(58) Field of Classification Search
USPC ........................... 340/901, 904, 905, 936, 928
See application file for complete search history.

(56) References Cited

U.S. PATENT DOCUMENTS

| | | | | |
|---|---|---|---|---|
| 5,310,999 | A * | 5/1994 | Claus et al. ................. | 235/384 |
| 8,131,456 | B2 * | 3/2012 | Mahalingaiah et al. ...... | 701/117 |
| 8,274,371 | B2 * | 9/2012 | Park et al. .................... | 340/10.4 |
| 2002/0101332 | A1 | 8/2002 | Talmadge et al. | |
| 2004/0019412 | A1 * | 1/2004 | Miyamoto ................. | 701/1 |
| 2005/0273218 | A1 | 12/2005 | Breed et al. | |
| 2006/0145893 | A1 * | 7/2006 | Hassett ....................... | 340/928 |
| 2006/0197682 | A1 * | 9/2006 | Crocker et al. ............. | 340/902 |
| 2006/0229777 | A1 * | 10/2006 | Hudson et al. .............. | 701/29 |
| 2011/0221612 | A1 * | 9/2011 | Fuse ............................ | 340/905 |
| 2013/0009790 | A1 * | 1/2013 | Serex .......................... | 340/905 |

OTHER PUBLICATIONS

International Search Report and Written Opinion of the International Searching Authority issued in international Application No. PCT/US2012/059463, Jan. 3, 2013, 10 pages.

International Preliminary Report on Patentability issued in International Application No. PCT/US2012/059463 on Jan. 28, 2014; 5 pages.

Written Opinion of the International Preliminary Examining Authority issued in International Application No. PCT/US2012/059463 on Nov. 6, 2013.

* cited by examiner

*Primary Examiner* — Brent Swarthout (74) *Attorney, Agent, or Firm* — Fish & Richardson P.C.

(57) ABSTRACT

In some implementations, a method for wirelessly communicating with the processor of a vehicle includes receiving, from a status module in a vehicle, a value for a dynamic attribute of the vehicle. The value for the dynamic attribute is wirelessly transmitted, from the vehicle, to a Radio Frequency (RF) reader.

18 Claims, 12 Drawing Sheets

COMMUNICATING STATUSES OF VEHICLES

TECHNICAL FIELD

This invention relates to radio frequency signals and, more particularly, to communicating statuses of vehicles.

BACKGROUND

In some cases, an RF reader operates in a dense reader environment, i.e., an area with many readers sharing fewer channels than the number of readers. Each RF reader works to scan its interrogation zone for transponders, reading them when they are found. Because the transponder uses radar cross section (RCS) modulation to backscatter information to the readers, the RFID communications link can be very asymmetric. The readers typically transmit around 1 watt, while only about 0.1 milliwatt or less gets reflected back from the transponder. After propagation losses from the transponder to the reader the receive signal power at the reader can be 1 nanowatt for fully passive transponders, and as low as 1 picowatt for battery assisted transponders. When a low-power signal of narrow frequency bandwidth is received by an RF reader, the signal to noise ratio of the received signal may be very small.

SUMMARY

In some implementations, a method for wirelessly communicating with the processor of a vehicle includes receiving, from a status module in a vehicle, a value for a dynamic attribute of the vehicle. The value for the dynamic attribute is wirelessly transmitted, from the vehicle, to a Radio Frequency (RF) reader.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
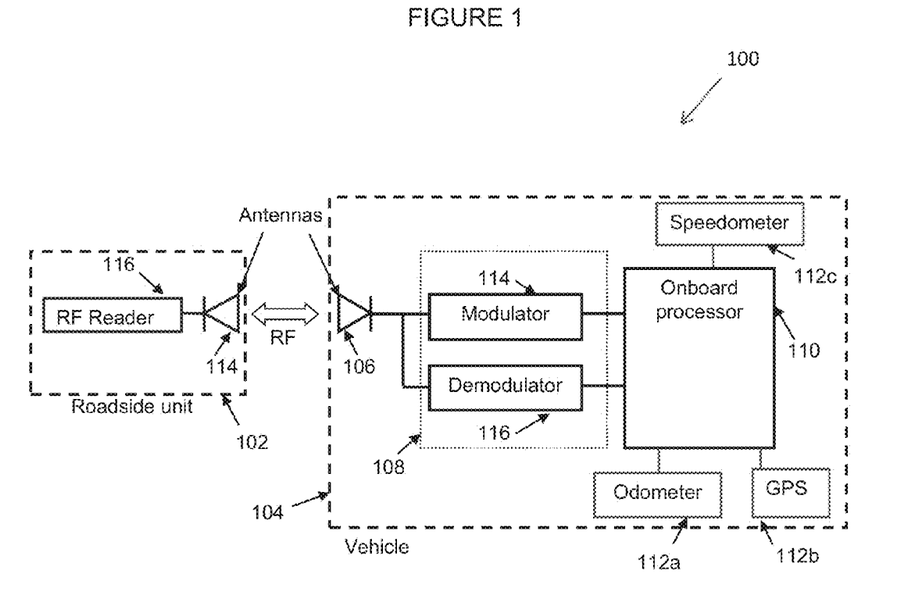
FIG. 1 is a block diagram illustrating an example system for transmitting dynamic attributes of vehicles.

FIG. 1 is a block diagram illustrating an example system 100 for enabling wireless communication with a system of a vehicle in accordance with some implementations of the present disclosure. For example, the system 100 may determine values for one or more dynamic attributes of a vehicle and wireless communicate with them with an RF reader. Dynamic attributes may include speed, location, mileage, tire pressure, engine status, oil level, engine temperature, battery level, number of passengers, expired license, insurance, safety checks, or other attributes of a vehicle that may vary over time. In some implementations, the system 100 may execute one or more of the following: detect different dynamic attributes using a plurality of sensors; transfer the plurality of values to a processing unit of the vehicle; wirelessly transmit the values to an RF reader; wireless receive a notification (e.g., violation) from the RF reader; and present the notification to the driver of the vehicle. By including wireless communication with a vehicle's processor, the system 100 may provide accurate, real-time values for dynamic attributes of a vehicle. In some implementations, the system 100 utilizes a number of components, some of which already exists within a vehicle, to allow for wireless communication with a vehicle's computer, and certain components may added beyond those already available within a vehicle to enable the communication between a roadside unit and a vehicle's processor via, for example, an on-board transceiver.

At a high level, the system 100 includes a roadside unit 102 communicably coupled with vehicle 104 through a wireless connection. The roadside unit 102 may transmit a request for information to the vehicle 104 through one or more antennas. In response to at least the request, the vehicle 104 may transmit information identifying values for dynamic attributes of the vehicle 104. The reader 102 may determine a current value for a dynamic attribute associated of the vehicle 104 based on the received signal. As illustrated, the roadside unit 102 includes an RF reader 116 and an antenna 114. The vehicle 104 includes an antenna 106 for wireless communication, transceiver 108 for converting between RF signals and baseband signals, onboard processor 110, and status modules 112*a-c* for determining values for dynamic attributes. The transceiver 108 includes a modulator 114 for converting baseband signals from the processor 110 to RF signals for transmission through the antenna 106 and a demodulator for converting RF signals from the antenna 106 to baseband signals for the processor 110.

The RF reader 116 can include any software, hardware, and/or firmware configured to transmit and receive RF signals. In some implementations, the RF reader 116 can determine values for dynamic attributes of the vehicle 104 based on received wireless signals. The RF reader 116 may transmit requests for information within an interrogation zone associated with the roadside unit 102. The reader 116 may transmit the query in response to a request, automatically, in response to a threshold being satisfied (e.g., expiration of time), as well as others events. The interrogation zone may be based on one or more parameters such as transmission power, associated protocol, nearby impediments (e.g., objects, walls, buildings), as well as others. In some implementations, the RF reader 116 may transmit multiple requests for information to the vehicle 104 to determine current attributes. For example, the RF reader 116 may determine or otherwise identify a speed of the vehicle 104 based on a received signal encoding the speed.

In some implementations, the RF reader 116 may include a controller, a transceiver coupled to the controller, and an RF antenna 114 coupled to the transceiver. For example, the RF antenna 114 may transmit commands generated by the controller and receive responses from the vehicle 104. In certain cases such as tag-talks-first (TTF) systems, the reader 116 may not transmit commands but only RF energy. In some implementations, the controller can determine statistical data and/or position data based, at least in part, on tag responses. The reader 116 often includes a power supply or may obtain power from a coupled source for powering included elements and transmitting signals. In some implementations, the reader 116 operates in one or more of frequency bands allotted for RF communication. For example, the Federal Communication Commission (FCC) have assigned 902-928 MHz and 2400-2483.5 MHz as frequency bands for certain RFID applications. In some implementations, the reader 116 may dynamically switch between different frequency bands. The reader 116 can, in some implementations, include three or more antennas 114 in any geometric configuration that allows triangulation based, at least in part, on TDOA. In some implementations, the antennas 114 may be selectively positioned to optimize, enhance, or otherwise increase precision and/or accuracy of position tracking. In pulse compressing backscattered signals, the reader 116 may receive that backscattered signal, a wide bandwidth signal, and compress the pulse using a long time duration match filter, a correlation receiver and/or other module to achieve substantial processing gain. For example, the reader 116 may achieve a factor of 60 dB processing gain, which may translate to lower radiated power requirements from the transponder. In some implementations, the reader 116 can determine the pulse-compressed signal based, at least in part, on the backscattered spread-spectrum signal from the tag 102. For example, the reader 116 may store or otherwise identify the pseudorandom sequence used by the tag 102 to determine the pulse-compressed signal.

In some implementations, the reader 116 may transmit a modulated RF signal polling command to the local on-board transceiver 108 installed in the vehicle or other object. The reader 116 transmits a modulated RF signal using the antenna 114. Though, the reader 116 may use any suitable formats and/or protocols without departing from the scope of this disclosure. For example, the reader 116 may transmit a simple amplitude modulation (AM) to simplify and reduce the cost of the on-board transceiver 108. The reader 116 may also receive a return signal from the on-board transceiver 108. Many types of commercial readers already exist including those used in radio frequency identification (RFID), Bluetooth, cell phones, etc. Frequencies may be in a range from about 433 MHz to about 5.9 GHz. The selection criteria may include such factors as read distances, baud rates, costs, etc.

The vehicle 104 can include any vehicle for transporting people are objects such as automobiles, vans, buses, snowmobiles, all-terrain vehicles, Segways, or other such devices. In the illustrated embodiment, vehicle 104 includes the onboard processor 110. The processor 110 can include any hardware, software, and/or firmware operable to receive values for dynamic attributes from the sensors 112a-c and pass information identifying the values to the transceiver 108 for wireless transmission. As previously mentioned, the status modules 112a-c may determine information such as speed, mileage, fuel tank level, location based on, for example, Global Position System (GPS), collision information, or any other suitable information associated with the vehicle 104. The processor 110 may retrieve or otherwise receive the speed of the vehicle 104 from the speedometer 112c. Similarly, the processor 110 may transmit requests to or otherwise receive information from other modules 112 associated with vehicle 104 such as the odometer 112a, GPS 112b, collision sensors (e.g., accelerometers), or others. Processor 110 may periodically retrieve values for dynamic attributes and/or retrieve the values for dynamic attributes in response to an event. For example, processor 110 may retrieve values for dynamic attributes in response to a request from the roadside unite 102, expiration of a timer, motion sensors, and/or any other suitable event. Upon receiving of the values for dynamic attributes, the processor 110 may overwrite previous values or merge the current values with previously stored information. After gathering values for dynamic attributes, the processor 110 may wirelessly transmit one or more values to the roadside unit 102 using the transceiver 108. The transmission of the values for dynamic attributes may be periodic and/or in response to an event.

In some aspects of operation, the onboard antenna 106 may receive a signal transmitted by the reader 116 and may be tuned to the frequency of operation of the reader(s) 116. The transceiver 108 may demodulate the captured RF signal in order to identify the data. While many types of demodulators 114 may be used, the read distances may be relatively short (less than 100 feet) so that inexpensive demodulators would be incorporated. The demodulator 114 may pass the demodulated signal to the onboard processor 110 through, for example, a serial port. The processor 110 may be incorporated into the vehicle 104 during standard manufacturing. After demodulation, an amplifier stage may be included to increase the voltage level of the signal so that the signal can be properly sensed by the processor 110. The processor 110 may include one or more inputs for receiving information from the status modules 112a-c and that may be communicated back to the roadside unit 102. These status modules 112 could include odometer 112a, GPS 112b, or speedometer 112c but is not limited to these modules. The processor 110 may communicate information to the roadside unit 102 by sending a serial signal to the modulator 114 which could either use backscattering (modifying the carrier signal transmitted from the roadside reader/antenna) or it could generate a transmit signal. The modulated signal from the vehicle 104 may be detected by the roadside reader 102.

Figure 2A:
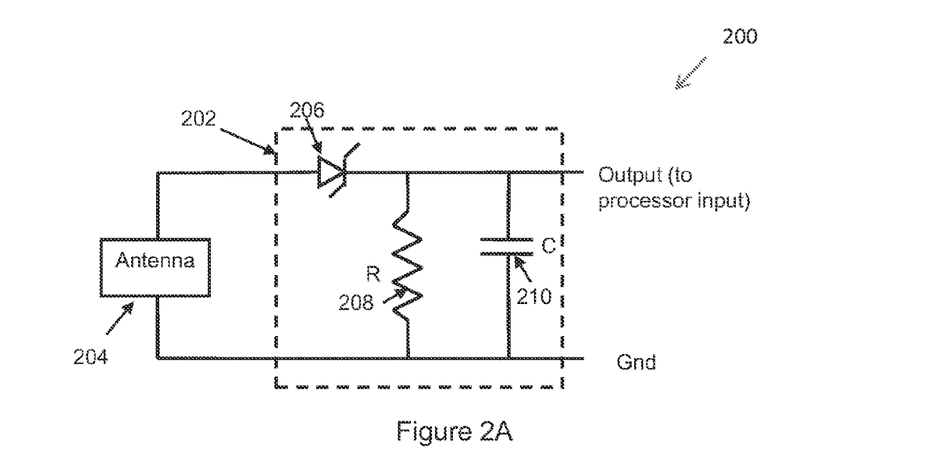
FIGS. 2A and 2B illustrate example demodulators for demodulating received signals.
Figure 2B:
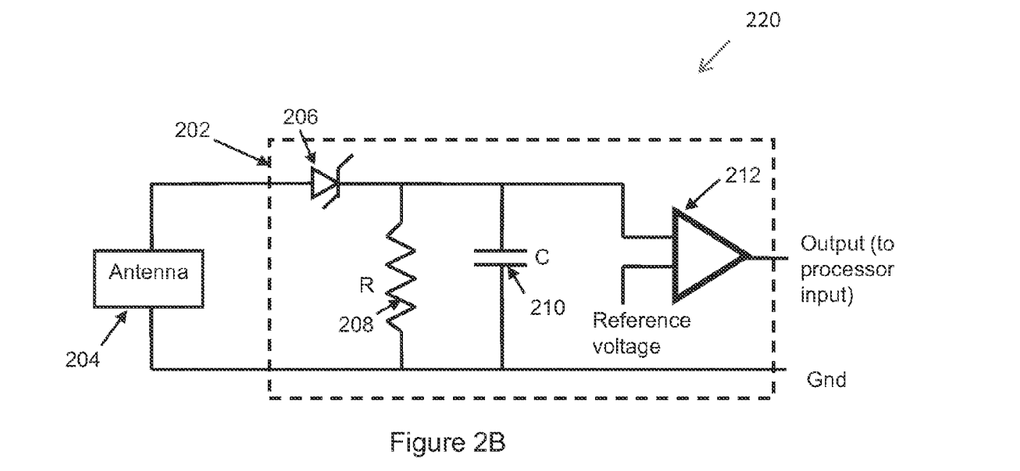

FIGS. 2A and 2B illustrate example demodulators 200 and 220, respectively. Referring to FIG. 2A, the demodulator 200 includes an antenna 204, a diode 206, a resistor 208, and a capacitor 210. The demodulator 200 may detect the RF wireless communication from the reader 116. The antenna 2 may be a resonant circuit tuned to the frequencies transmitted by the reader 116. The diode 206 (e.g., Schottky diode) may be a rectifying device while the values of resistor 208 and capacitor 210 may be selected to filter the carrier signal while allowing the modulated envelope to be reproduced. The modulated digital signal may be the data input to the processor 110. Referring to FIG. 2B, the demodulator 220 also includes an amplifier 212 that may increase the output signal level.

Figure 3:
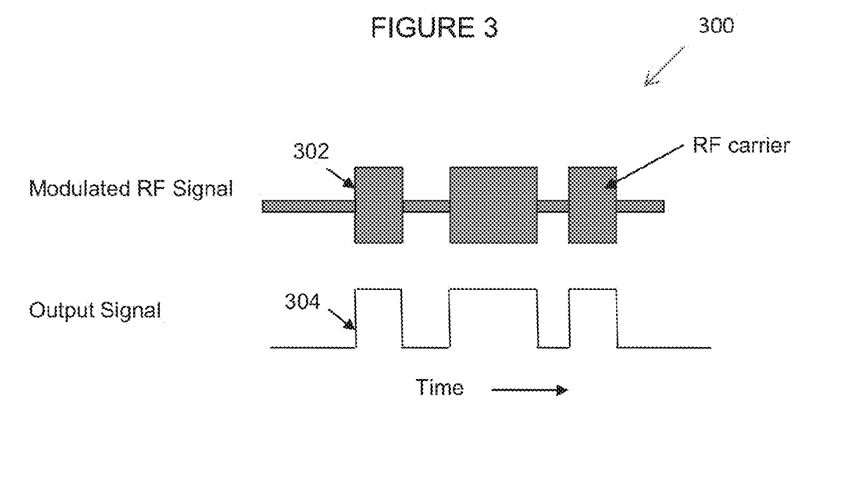
FIG. 3 illustrates a received signal and a demodulated signal.

FIG. 3 is a schematic 300 illustrating a modulated RF signal 302 and an output signal 304 versus time. In some implementations, the RF signal 302 is received by the antenna 204 of FIG. 2, and the output signal 304 is the demodulated signals. The voltage of the output signal 304 changes in amplitude which corresponds to changes in the voltage of the RF modulated signal 302.

Figure 4:
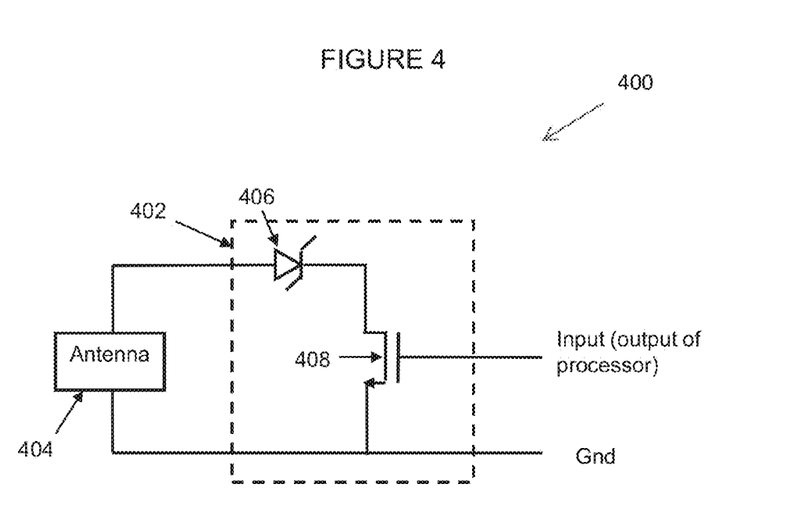
FIG. 4 illustrates an example modulator.

FIG. 4 illustrates an example transmission circuit 400. The transmission circuit 400 includes a backscatter modulation circuit 400 and an antenna 404. As illustrated, the circuit 402 includes a diode 406 and a capacitor 408. In these instances, the antenna 404 is exposed to RF energy transmitted from the reader 116. By turning the transistor 408 on, as controlled by the output of the vehicle's processor 110 in the form of data, the Schottky diode 406 is forward biased causing a change in the load on the antenna 404. As a result, the antenna's backscattered signal is changed which is detected by the reader 116 as shown in FIG. 1.

Figure 5:
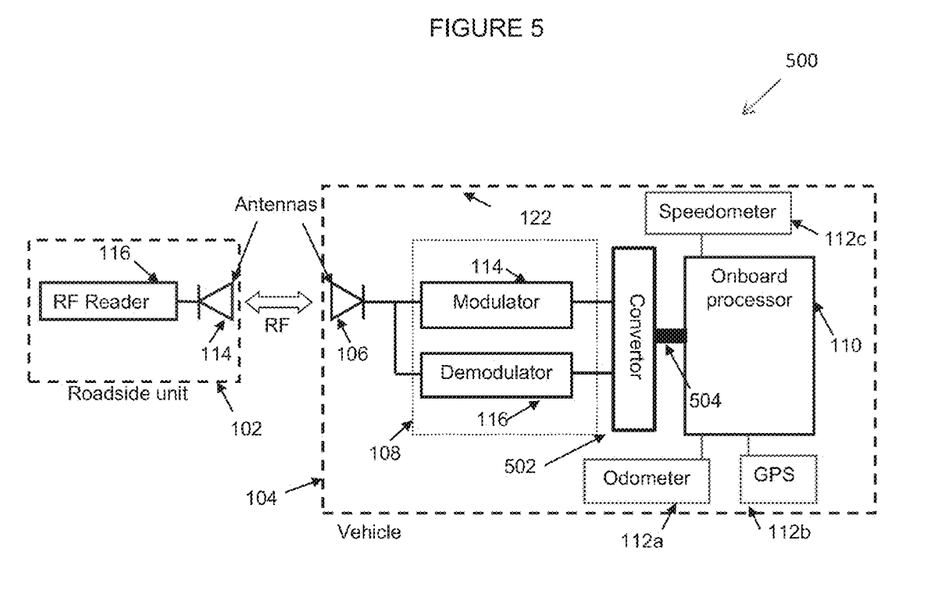
FIG. 5-10 are block diagrams illustrating different example systems for transmitting dynamic attributes of vehicles.

FIG. 5 is another example system 500 for enabling wireless communication with a system of a vehicle in accordance with some implementations of the present disclosure. As illustrated, the vehicle 104 includes a convertor 502 between the processor 110 and the modulator 114 and the demodulator 116. The convertor 502 includes any software, hardware, or firmware for converting between serial data and parallel data.

For example, the processor 110 may only include a parallel input so serial data from the demodulator 116 may be converted to the parallel input of the processor 110. In these instances, the convertor 502 may include multiple lines 504 for the data in parallel format, which enables sharing data between the convertor 502 and the processor 110. This convertor 502 may also have the ability to convert the processor's parallel output data to serial data that can be transmitted via the modulator 114 to the roadside unit 102.

Figure 6:
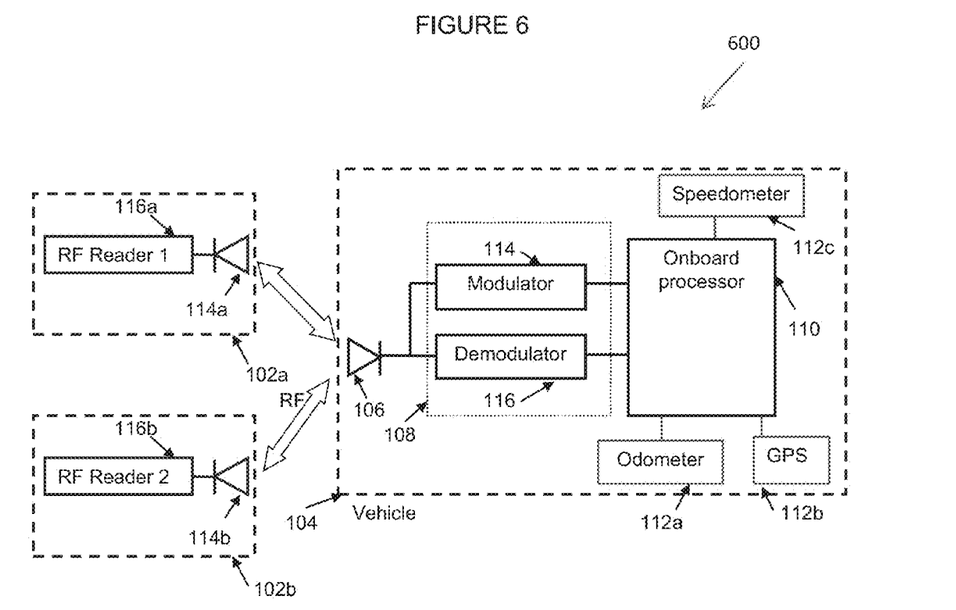

FIG. 6 is yet another example system 600 for enabling wireless communication with a system of a vehicle in accordance with some implementations of the present disclosure. As illustrated, the vehicle 104 includes a multi-tune antenna 106 configured to be tuned to a plurality of different frequencies. In other words, the vehicle 104 may communicate on different frequencies. Multiple-frequency communication may be useful when installing a new system to allow for backward compatible with legacy systems of a different frequency. In addition to roadside unit 102a (reader 116a and antenna 114a) operating at one frequency, a second roadside unit 102b (reader 116b and antenna 114b) operate at a second frequency.

Figure 7:
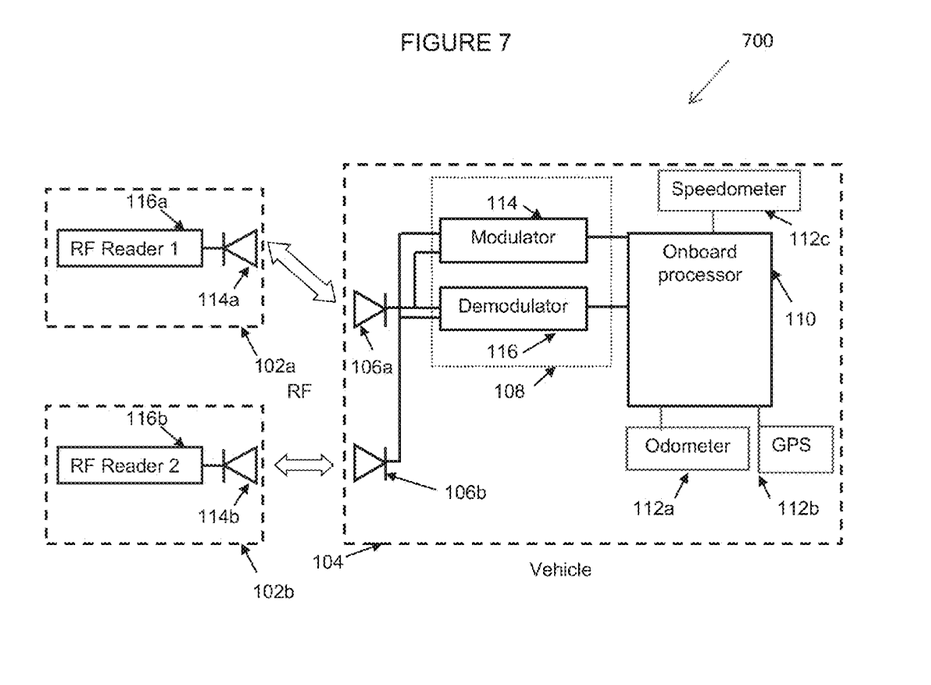

FIG. 7 is again another example system 700 for enabling wireless communication with a system of a vehicle in accordance with some implementations of the present disclosure. As illustrated, the vehicle 104 includes antennas 106a and 106b for communicating using at least two different frequencies. In other words, the antennas 106a and 106b enable multiple frequency detection on the vehicle 104 by replicating the antennas 106 along with the associated changes to the modulator 114 and demodulator 116. In these instances, the antenna 106a is tuned to a frequency which enables communication with the reader antenna 114a. The second antenna 106b operates on a second frequency which is used to communicate with the reader antenna 106b.

FIG. 8 is yet again another example system 800 for enabling wireless communication with a system of a vehicle in accordance with some implementations of the present disclosure. As illustrated, the vehicle 104 includes an RFID module 802 connected in parallel with the transceiver 108. For example, the system 800 has the ability to operate an RFID tag 802 in parallel with the vehicle's transceiver 108. There is market pressure to attach RFID tags to vehicles for both electronic toll collection (ETC) and electronic vehicle registration (EVR) for identification purposes. By placing an RFID module 802 in parallel with the transceiver 108, this configuration may allow the roadside reader 102 to communicate with both the onboard processor 110 and the RFID tag 802. The RFID chip (integrated circuit portion of the RFID module 802) may have an internal modulator and demodulator and may be similar in structure to the previously described transceiver.

Figure 8:
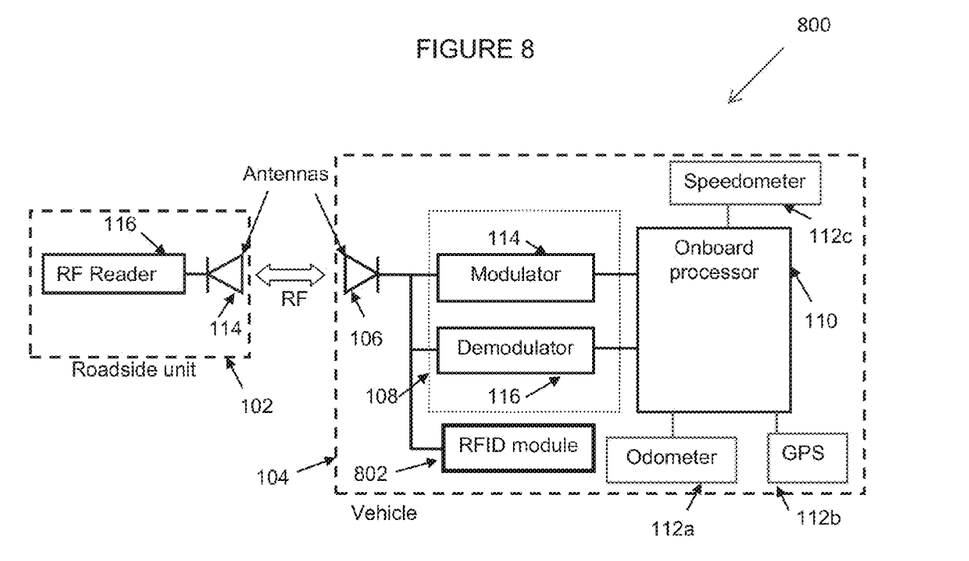

In some implementations, the RFID module 802 can include any software, hardware, and/or firmware configured to respond to communication from the RF reader 116. The module 802 may operate without the use of an internal power supply. Rather, the module 802 may transmit a reply using power stored from the previously received RF signals, independent of an internal power source. This mode of operation is typically referred to as backscattering. In some implementations, the module 802 may alternate between absorbing power from signals transmitted by the RF reader 116 and transmitting responses to the signals using at least a portion of the absorbed power. In passive tag operation, the module 802 typically has a maximum allowable time to maintain at least a minimum DC voltage level. In some implementations, this time duration is determined by the amount of power available from an antenna of a module 802 minus the power consumed by the module 802 and the size of the on-chip capacitance. The effective capacitance can, in some implementations, be configured to store sufficient power to support the internal DC voltage when there is no received RF power available via the antenna. The module 802 may consume the stored power when information is either transmitted to the module 802 or the module 802 responds to the RF reader 116 (e.g., modulated signal on the antenna input). In transmitting responses back to the RF reader 116, the module 802 may include one or more of the following: an identification string, locally stored data, tag status, internal temperature, and/or others. For example, the module 802 may transmit information including or otherwise identifying vehicle information such as type, weight, vehicle height, tag height, account number, owner information (e.g., name, license number), and/or other information. In some implementations, the signals can be based, at least in part, on sinusoids having frequencies in the range of 902-928 MHz or 2400-2483.5 MHz.

Figure 9:
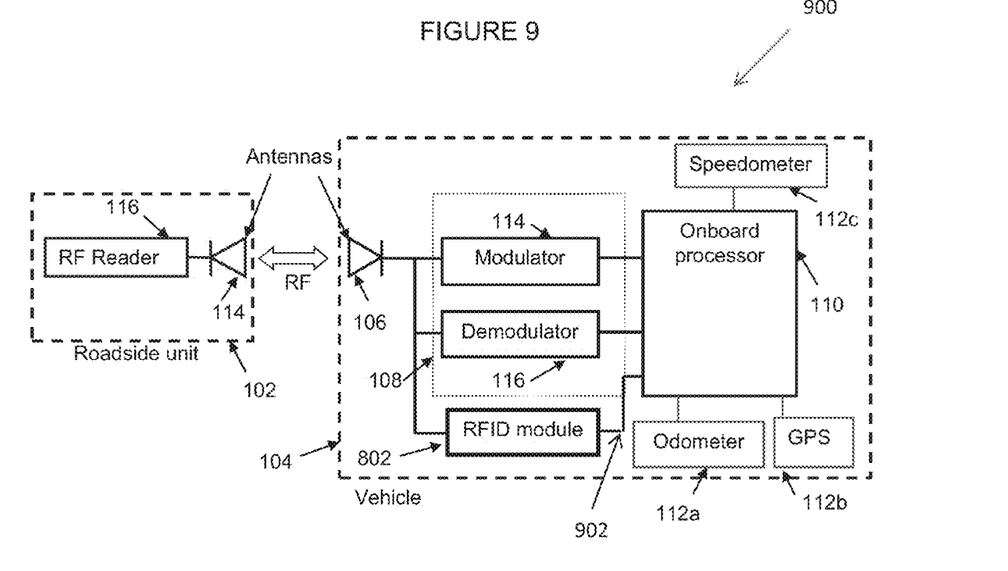

FIG. 9 is again another example system 900 for enabling wireless communication with a system of a vehicle in accordance with some implementations of the present disclosure. As illustrated, the vehicle 104 includes the RFID module 802 connected in parallel with the transceiver 108 and also directly connected to the processor 110 through the connection 902. In these instances, the RFID integrated of module 802 may include data Input/Output (I/O) ports. Using these ports, the module 802 may directly communicate with the vehicle's processor 110. In some implementations, the transceiver 202 may be removed such that the reader 116 only communicates with the processor 110 using the RFID module 802.

Figure 10:
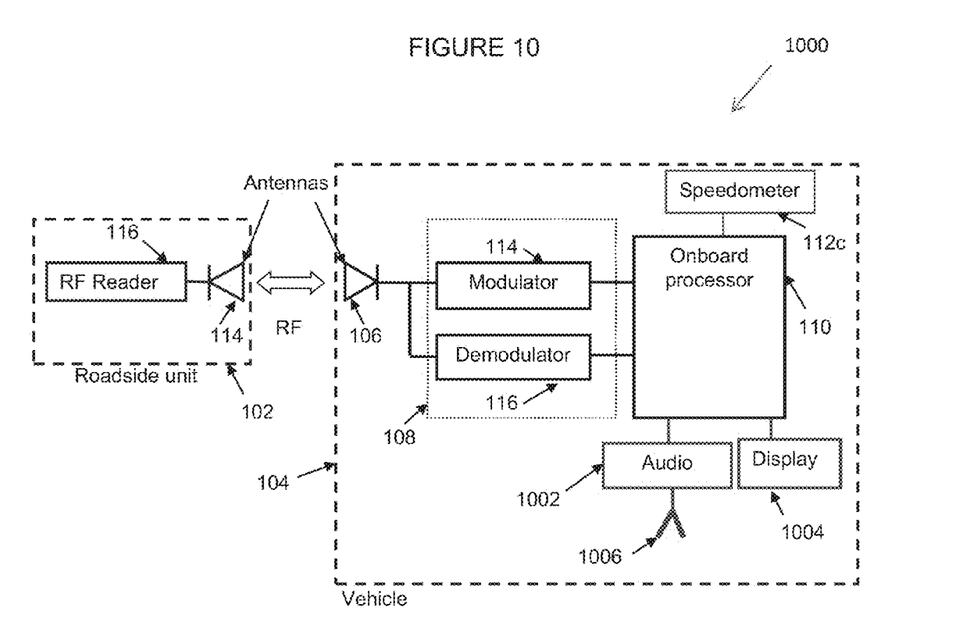

FIG. 10 is also an example system 1000 for enabling wireless communication with a system of a vehicle in accordance with some implementations of the present disclosure. As illustrated, the vehicle 104 includes an audio module 1002 for presenting sounds through a speaker 1006 and a display 1004 for displaying information. In these instances, the system 1000 can communicate to the vehicle's passengers through using a visual and/or audio response. The audio module 1002 and the display 1004 may be interfaced to the vehicle's processor 1000 during manufacturing and may be used to alert the passengers. As an example, after determining that that the vehicle 104 is traveling in excess of the speed limit, a message may be sent to the vehicle's processor 110 to activate the audio module 1002 to notify the driver that he is driving beyond the speed limit. Notifications may also be displayed through the vehicle's display 1004. In some implementations, the roadside unit 102 can communicate to the processor 110 in the fashion previously described. Upon the processor 110 receiving the command to communicate the information to the passenger in audio form, the audio module 1002 may be activated and broadcast the audio signal using the speaker 1006. In addition or alternatively, the processor 110 may activate the display 1004 to present notifications to the passengers.

Figure 11A:
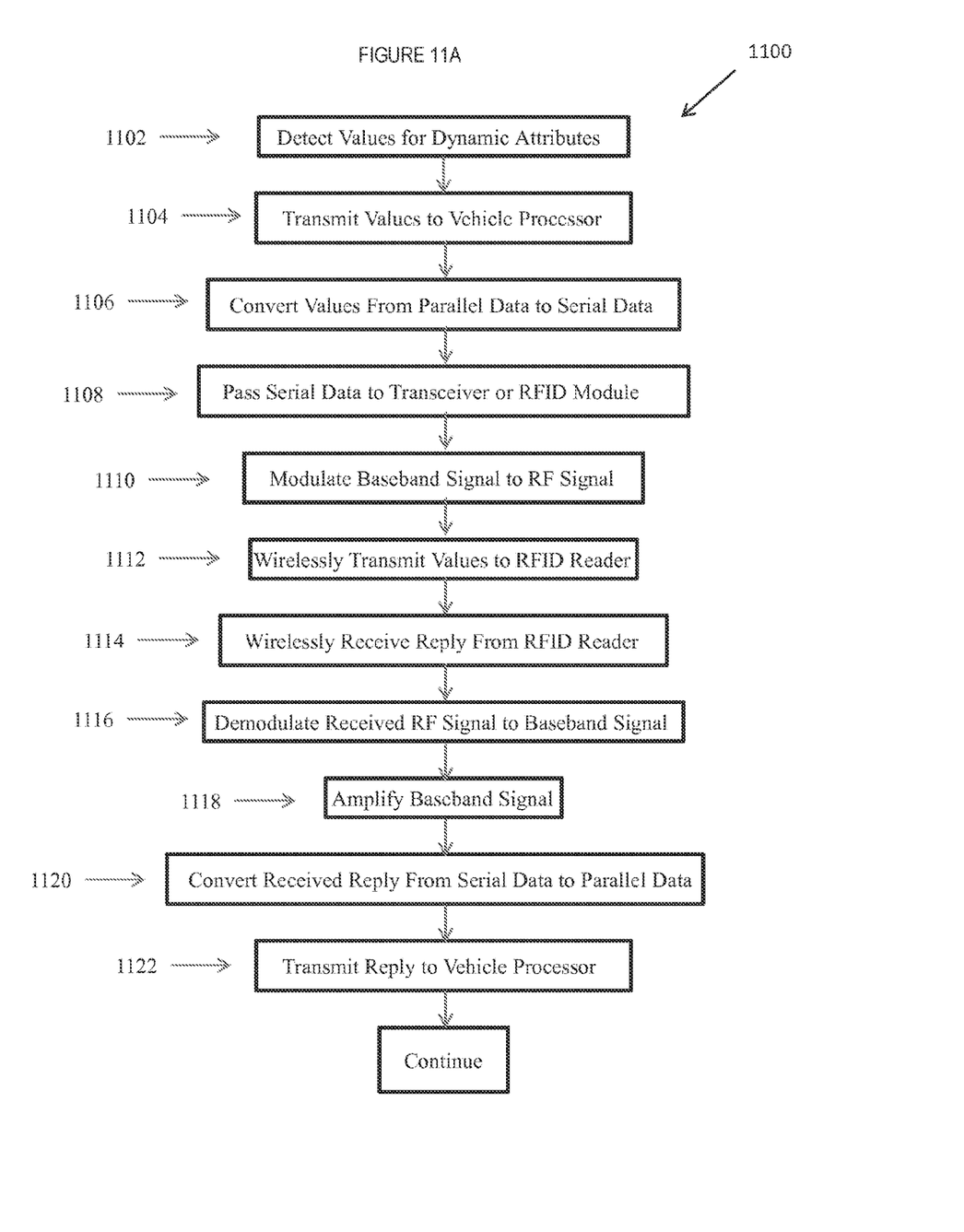
FIGS. 11A-B are a flowchart illustrating example methods for transmitting dynamic attributes of vehicles.
Figure 11B:
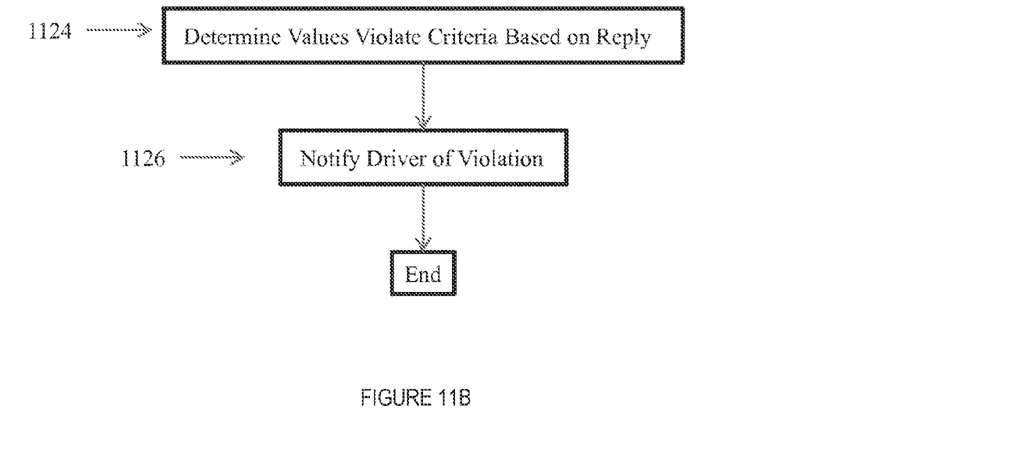

FIGS. 11A-B are a flowchart illustrating an example method 1100 for communicating values for dynamic variables of vehicles. In particular, the methods 1100 may transmit detected values to RF readers and present any notifications. This method is for illustration purposes only and that the described or similar techniques may be performed at any appropriate time, including concurrently, individually, or in combination. In addition, many of the steps in the flowchart may take place simultaneously and/or in different orders than as shown. Moreover, systems may use methods with additional steps, fewer steps, and/or different steps, so long as the methods remain appropriate.

Method 1100 begins at step 1102 where values for dynamic attributes are detected. For example, the status modules 112 in FIG. 1 may detect values for dynamic attributes such as speed, tire pressure, GPS location, and/or others. Next, at step 1104, the values are transmitted to the vehicle processor. In the example, the status modules 112 may transmit the detected values to the vehicle processor 110. At step 1106, the values are converted from parallel to serial data. As for the example, the processor 110 may pass serial data to a converter 502 as illustrated in FIG. 5 that converts parallel data from the processor 110 to serial data for the transceiver 108. The data is passed to either a transceiver or an RFID module for wireless transmission at step 1108. For example, the processor 110 may pass the data to the transceiver 108 or the RIFD module 802 illustrated in FIG. 8. Regardless, at step 1110, the baseband signal encoding the values is modulated to an RF signal. In the example, the modulator 114 or a modulator in the RFID module 802 may modulate the baseband signal to an RF signal. At step 1112, the RF signal identifying the values for the dynamic parameters is wireless transmitted to an RF reader. As for the example, the antenna 106 may wirelessly transmit the RF signal to the reader 116. Next, at step 1114, a response from the RF reader is wirelessly received. Returning to the example, the RF reader 116 may transmit a response to the vehicle 104. The received RF signal is demodulated to a baseband signal at step 1116. As for the example, the demodulator 116 may receive the RF signal from the antenna 106 and demodulate the RF signal to a baseband signal. At step 1118, the base band signal may be amplified. For example, the baseband signal may be amplified using the amplifier 212 of FIG. 2B. The baseband signal is converted from serial data to parallel data at step 1120 and transmitted to the processor at step 1122. Next, at step 1124, the detect values are determined to violate one or more criteria. In the example, the processor 110 may determine that the reply indicates that the one or more values violate predefined criteria. At step 1126, the driver is notified of the violation. For example, the processor 110 may present the notification audibly or visually using the audio module 1002 or the display 1004, respectively.

What is claimed is:

1. A system for wirelessly communicating with a processor of a vehicle, comprising:
    a vehicle processor connected to a plurality of status modules in a vehicle, a transceiver, and a dashboard of the vehicle and configured to receive, from the status modules, values for dynamic attributes of the vehicle and notify a driver of the vehicle of one or more of the values of the dynamic attributes through the vehicle dashboard, wherein the vehicle processor and the plurality of status modules are embedded in a vehicle computer system;
    an antenna;
    the transceiver connected to the antenna and the processor and configured to wirelessly communicate at least one of the values for the dynamic attributes to roadside Radio Frequency Identifier (RFID) readers;
    an RFID module connected to the antenna in parallel with the transceiver and configured to wirelessly communicate with the roadside RFID readers; and
    a converter connected to the transceiver and the vehicle processor and configured to convert between serial data and parallel data.

2. The system of claim 1, wherein the transceiver is configured to demodulate and modulate a carrier signal.

3. The system of claim 2, further comprising:
    a demodulator configured to demodulate the carrier signal; and
    an amplifier connected to the demodulator and configured to amplify wirelessly communications.

4. The system of claim 1, wherein the plurality of status modules include a sensor configured to detect the value for the dynamic attribute.

5. The system of claim 1, wherein the plurality of status modules includes at least one of an odometer, a Global Positioning System (GPS), or a speedometer.

6. The system of claim 1, wherein the transceiver includes a plurality of antennas each of the antennas configured to communicate using a different frequency.

7. The system of claim 1, wherein the processor is further configured to receive, from the RFID reader, a notification for a user of the vehicle of one or more conditions.

8. The system of claim 7, wherein the notification indicates that the at least one of the values for the dynamic attributes violates one or more criteria, and the processor further configured to automatically notify the user in response to at least the violation.

9. The system of claim 8, wherein the notification comprises at least one of an audio notification or a visual notification.

10. A method for wirelessly communicating with a processor of a vehicle, comprising:
    receiving, from a vehicle processor connected to a plurality of status modules in a vehicle, a transceiver, an antenna and a dashboard of the vehicle, values for dynamic attributes of the vehicle, wherein the vehicle processor and the plurality of status modules are embedded in a vehicle computer system;
    notifying a driver of the vehicle of one or more of the values of the dynamic attributes through the vehicle dashboard;
    converting from parallel data to serial data prior to wirelessly transmitting the value to an RFID reader;
    wirelessly transmitting, by the transceiver in the vehicle, at least one of the values for the dynamic attributes to the Radio Frequency Identifier (RFID) reader; and
    wirelessly communicating, by an RFID module in the vehicle, with the RFID reader, the RFID module connected to the antenna in parallel with the transceiver.

11. The method of claim 10, further comprising:
    receiving a baseband signal from the vehicle processor of the vehicle identifying the at least one of the values of the dynamic attributes; and
    modulating the baseband signal to a RF signal identifying the at least one of the values of the dynamic attributes.

12. The method of claim 11, wherein the baseband signal comprises a first baseband signal, further comprising:
    wirelessly receiving an RF signal from the RFID reader;
    demodulating the received signal to a second baseband signal; and
    amplifying the second baseband signal.

13. The method of claim 10, wherein the at least one of the values comprises a signal from a sensor included in the vehicle.

14. The method of claim 13, wherein the sensor comprises at least one of an odometer, a Global Positioning System (GPS), or a speedometer.

15. The method of claim 10, wherein the RFID reader comprises a first RF reader, and the value is transmitted using a first frequency, the method further comprising communicating with a second RF reader using a second frequency different from the first frequency.

16. The method of claim 10, receiving, from the RFID reader, a notification for a user of the vehicle of one or more conditions.

17. The method of claim 16, wherein the notification indicates that the at least one of the values for the dynamic attributes violates one or more criteria, the method further comprising automatically notifying the user in response to at least the violation.

18. The method of claim 17, wherein the notification comprises at least one of an audio notification or a visual notification.

* * * * *